Feb. 19, 1946.   M. WATTER   2,395,205
AIRCRAFT STRUCTURE
Filed March 11, 1941   2 Sheets-Sheet 1

INVENTOR
Michael Watter
BY John P. Tarbox
ATTORNEY

INVENTOR
Michael Watter
BY John P. Tarbox
ATTORNEY

Patented Feb. 19, 1946

2,395,205

UNITED STATES PATENT OFFICE 2,395,205

AIRCRAFT STRUCTURE

Michael Watter, Philadelphia, Pa., assignor to Edward G. Budd Manufacturing Company, Philadelphia, Pa., a corporation of Pennsylvania Application March 11, 1941, Serial No. 382,706

7 Claims. (Cl. 189—34)

The present invention, which is a continuation-in-part of my copending application Serial No. 285,360, filed July 19, 1939, relates to aircraft structures, and more particularly to an improved skin sheet and rib construction for airfoils and the like.

Airfoils or the like of aircraft structures of the cantilever stressed skin type are subjected to high compression or vacuum forces caused by the flight of the aircraft through the air imposing high tension and compression forces in the wing surfaces. In order to reinforce their construction, it has been customary to attach the skin sheets to sheets of metal having substantially sinuous corrugations to provide tension strength, as well as to resist buckling. Preferably, such reinforcing sheets were welded or riveted to chord members of a rib construction whenever metal skin sheets were used, before they were welded or riveted to the corrugations of the reinforcing sheets.

The corrugated sheets, in some instances, were first secured to the chord members of the rib construction, for example, by welding the convex portions of the corrugations at the underside thereof to the chord members. Thereafter, the skin sheets were secured to the corrugated sheets, for example, by welding the skin sheets to the convex portions or crests of the corrugations at the upper side of the reinforcing sheets. These operations were quite difficult and required considerable time and effort on the part of the welder because the portions of the corrugated sheets to be welded were not readily accessible and the welds had to be made by welding electrodes which required individual positioning at the point of weld on both sides of the sheet to place them in proper opposed alignment with each other. To maintain access to the inside of a hollow wing for application of one electrode, or pairs of electrodes, in many instances creates enormous difficulties in spot weld wing fabrication.

In other cases, the skin sheets were first secured to the corrugated sheets and thereafter the corrugated sheets were secured to the chord members. In order to accomplish this by welding, the lower convex portions of the corrugations had to be provided with tabs or extensions adapted to be engaged by a welding electrode and welded to the chord members. Preferably, these tabs or extensions were welded to the corrugated sheets and this required additional time and labor and consequently increased the cost of the fabrication.

The present invention aims to overcome the foregoing difficulties and disadvantages by providing an improved skin sheet and rib construction which can be economically fabricated, readily assembled, and which can withstand such stresses as may be imposed.

An object of the invention is to provide an improved skin reinforcing structure composed of a plurality of channel members arranged side by side and secured to each other as well as the skin and rib structure.

Another object is to provide a skin reinforcing member shaped in cross section to cooperate with adjoining members and facilitate spot welding the members to each other to build up a strong reinforcing skin structure.

Another object is to provide a reinforcing structure which is readily secured to the rib of aircraft structures and facilitates securing the skin sheet thereto and in which access by welding electrodes is considerably facilitated.

Another object is to provide a reinforcing structure adapted to be spot welded to the rib and adapted to have the skin sheets welded thereto in an expeditious manner.

Another object is to provide a reinforcing structure which may be first secured to either the rib or to the sheet skin by simple welding operations.

Another object is to provide a stronger reinforcing structure formed of thin sheet metal providing a light strong construction capable of resisting heavy stresses.

Another object is to reduce the weight of the reinforcing structure and to effect a saving in the cost of the material.

A further object is to simplify the method of welding skin sheets to reinforcing structure and greatly shorten the time heretofore required.

Other and further objects of the invention will be obvious upon an understanding of the illustrated embodiments about to be described, or will be indicated in the appended claims, and various advantages not referred to herein will occur to one skilled in the art upon employment of the invention in practice.

Preferred embodiments of the invention have been chosen for purposes of illustration and description, and are shown in the accompanying drawings, forming a part of the specification, wherein Fig. 1 is a fragmentary plan view of a skin sheet and rib construction, illustrating an embodiment of the invention;

Fig. 2 is a sectional view taken along the line

2—2 of Fig. 1, illustrating, in detail, the cross section of the reinforcing members;

Figure 1:
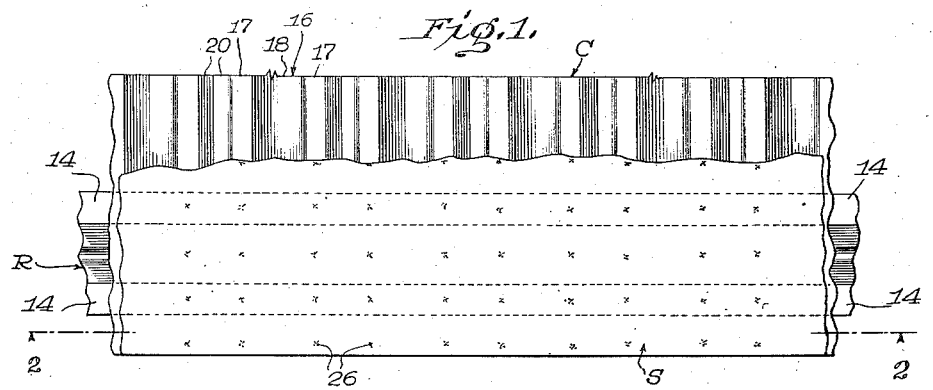
Figure 2:
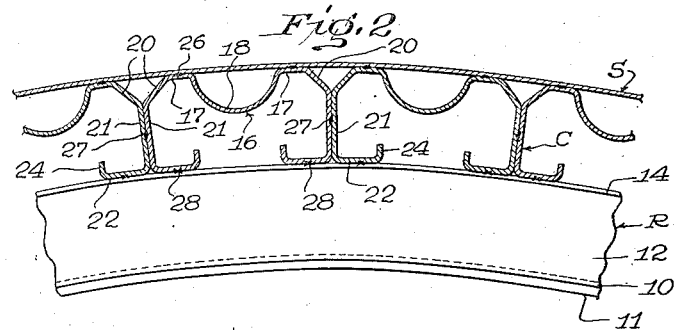
Figure 3:
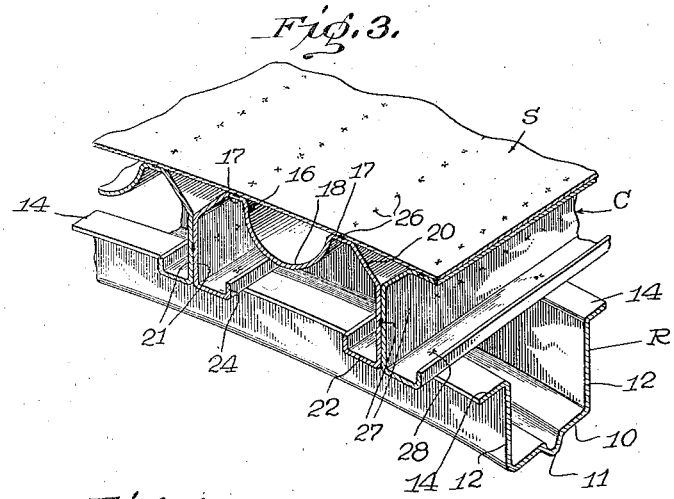
Fig. 3 is a fragmentary, sectional, perspective view of the construction shown in Figures 1 and 2.

Referring to the drawings in detail, in which like numerals refer to like parts throughout the several views, there is shown a reinforced skin and rib construction in Figs. 1, 2 and 3 which may be straight, or curved to enable it to be utilized for airfoils of a wing of an airplane or other parts of aircraft where it is desirable to reinforce the skin sheets. Generally, the construction comprises chord members R or other suitable stiffening members of a rib element, a reinforcing structure composed of a series of channel members C which are secured to the ribs, and a skin sheet S of relatively thin metal which is secured to the reinforcing structure.

The chord members R (Figs. 2 and 3) may be in the form of a channel member having a base 10 provided with a stiffening bead 11, spaced apart side flanges 12, and outwardly extending flanges 14 at the ends of the side flanges providing suitable surfaces to which the reinforcing structure may be secured.

The reinforcing structure of Figs. 2 and 3 is composed of a series of channel members C arranged side by side. Each of these channel members has a base or web portion 16 provided with spaced flat portions 17, and an inwardly offset arcuate portion 18 intermediate the flat portions 17, forming an intermediate corrugation. The flat portions 17 each have a substantially flat corner surface 20 extending to the side portions 21. The side portions 21 depend from the base and corner flat portions and abut corresponding side portions of adjacent members and are adapted to be secured thereto by spot welding. The end of each side portion is further provided with an inwardly extending flange 22 adapted to be secured to the chord members of the ribs and the flanges 22 each have an upwardly extending marginal flange 24 or other suitable means for stiffening the flanges 22 to minimize lengthwise bending thereof. The flanges 24 may be omitted, if desired, depending upon the strength required. The flat portions 20 diverge from the side portions 21 toward the skin sheet S and form with the skin sheet a closed chamber which in effect constitutes a corrugation intermediate the corrugations 18.

The channel members, constructed in the foregoing manner form a column and resist lengthwise bending and may be formed of relatively thin metal. When formed of thin metal, the spaced portions 17 of the base render the base slightly flexible and permits transverse bending of the channel members. This is desirable in cases where the chord members are curved to provide a rib for an airfoil, the reinforcing structure can be readily bent into a shape conforming to the chord members.

The channel members can be readily formed by rolling and/or stamping them from sheet material and simultaneously forming the contour of the base therein. Thereafter, the inwardly extending flanges 22 and the upwardly extending flanges 24 may be formed by suitable sheet metal bending machinery to complete the channel members. The composite reinforcing structure is then secured together by welding the contacting sides 21 of adjacent channel members.

In assembling the rib and skin sheet construction, the skin sheet S may be first welded to the flat surfaces 17 of the base of the channel members. This can be conveniently performed since the channel members have a relatively wide opening between the inwardly extending flanges 22 through which an electrode for engaging the underside of the flat surfaces may be extended.

Thereafter, the combined skin sheet and reinforcing structure is placed on the chord members to which it is to be secured. In the event that the chord members are curved, the reinforcing structure readily conforms to their curvature, and at the same time causes the skin sheet to conform thereto. When the reinforcing structure is mounted on curved chord members (Fig. 2) it tends to slightly stretch or tension the skin sheet. This is desirable because it serves to make the skin sheet smooth and prevents bulging or collapsing thereof. It will appear that access to the various flanges and side walls of the channel members for spot welding at points 26, 27 and 28 is readily afforded.

Figure 4:
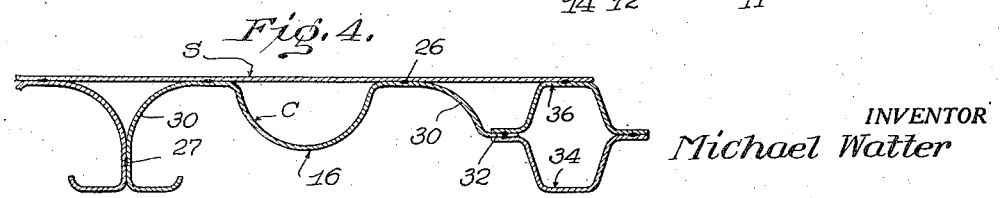
Fig. 4 is a view of a modified form of channel.

The channel member may be designed as shown in Fig. 4, if desired, the angular corners 20 being transformed into arcs 30 and the shape otherwise changed as illustrated and either modification may be formed above one edge as at 32 into a flange parallel with the skin, to cooperate with a stringer composed of opposed flanged channels 34 and 36.

Figure 5:
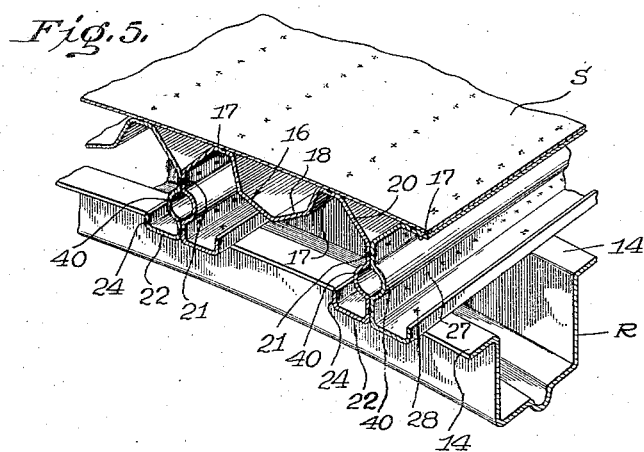
Fig. 5 is a perspective view similar to Fig. 3, showing a slightly modified form of reinforcing channel.

The construction in Fig. 5 is substantially the same as that of Fig. 3 except that instead of the side portions 21 of the channel members 16 being flat, each is provided with an arcuate corrugation 40 extending longitudinally thereof which when the side portion 21 is engaged with a corresponding side portion of an adjoining channel member combines with the corresponding corrugation 40 to provide a closed tubular section.

By providing the channel members 16 with corrugations 40, thinner gauge sheet metal may be employed and yet the resulting reinforcing structure will have greater strength, particularly with respect to its resistance to torsion stresses by reason of the added strength of the tubular sections.

It is to be noted in Fig. 5 that the side portions 21 are welded together above and below the corrugations 40, as indicated at 27.

Figure 6:
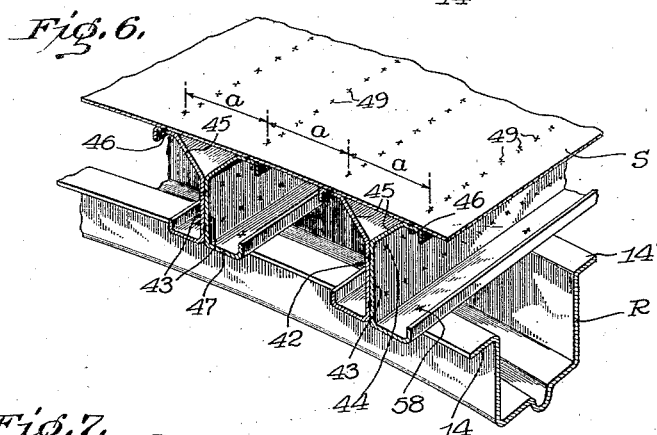
Fig. 6 is a perspective view similar to Fig. 3, showing a further modified form of reinforcing structure.

In the construction shown in Fig. 6, the reinforcing structure for the skin sheet S comprises a plurality of elements 42 which are generally Y-shaped in cross section. Each element comprises two identically formed parts having abutting parallel portions 43 securely welded together as indicated at 44, each of which has a portion 45 disposed at an angle to the vertical which terminates in a skin engaging flange 46. The portions 45, as shown in Fig. 6, diverge from the portions 43 toward the skin sheet S and thereby form rigid braces between the flanges 46 which are welded to the skin and the portions 43. The lower ends of the portions 43, as in the case of the previous constructions, are provided with flanges 47 for attachment by welding, as indicated, to the chord flanges 14.

Instead of the elements 42 being of two parts, as described, they may, if desired, be of single piece construction and fabricated by an extrusion process from aluminum or alloys thereof.

One particular advantage of the construction of Fig. 6 is that the elements 42 can be so arranged with respect to the skin sheet S as to provide for equidistant spacing of the lines of welds 49, as indicated by the letters "a."

Figure 7:
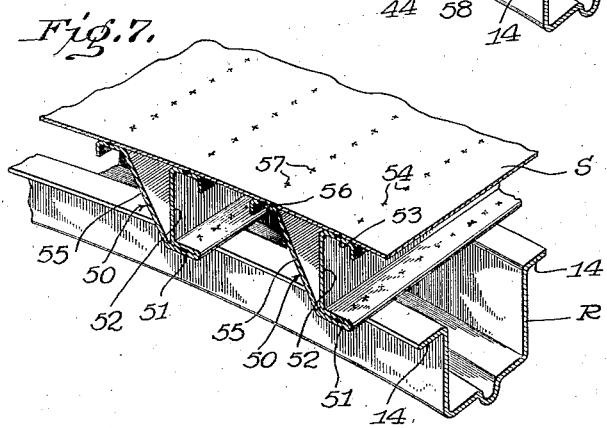
Fig. 7 is a perspective view similar to Fig. 6, showing a modified skin reinforcing element of one-piece construction.

A further modified construction is indicated in Fig. 7 as comprising an element 50 fabricated from a single piece of metal to provide a reversely bent or folded double thickness rib chord attaching flange 51, one portion 52 of which is disposed substantially at ninety degrees to the skin sheet and provided with a marginal flange 53 welded as indicated at 54 to the skin sheet, and the other portion 55 of the which diverges from the portion 52 toward the skin sheet and is provided with a flange 56 also welded as indicated at 57 to the skin sheet C. The flanges 51 of the elements 50 are welded as indicated at 58 to the flanges 14 of the rib chords R. The construction of Fig. 7 provides a rigidly reinforced structure and provides for economic production because of the single piece construction, it being obvious that no welding operations are required to join component parts of each reinforcing element 50, the only welding operations necessary being those required for attaching the flanges 53 and 56 to the skin sheet and the double thickness flange 51 to the rib chords R.

From the foregoing description, it will be seen that the present invention provides a simple combined skin sheet and rib construction which is economical to manufacture and can be readily assembled. The channel or reinforcing members may be formed of thinner material than heretofore utilized without sacrificing resistance to lengthwise bending. At the same time, the channel members are transversely flexible to be conformed to the curvature of the chord members and thereby serve to slightly stretch the skin sheet welded thereto. The structure is rugged and can readily withstand any severe forces to which it may be subjected and, also, all welding operations are performed by the easy and convenient application of the welding tools to the parts in question, the parts being of open stringer construction and not closed as in the case of previously employed skin sheet corrugated reinforcements.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

What I claim is:

1. A reinforced skin-covered construction for aircraft and the like, comprising a skin sheet, a frame runner at a distance therebelow, and a series of skin reinforcing stringer members arranged side by side transversely of the frame runner, said members each having a base provided with a pair of substantially flat surfaces secured to the skin sheet and a corrugated portion intermediate the flat surfaces, spaced apart side portions depending from said base and secured to side portions of adjacent members, and a flange extending inwardly from said side portions secured to the said frame runner members.

2. A reinforced skin sheet and frame construction comprising a relatively thin metal skin sheet, a frame runner at a distance therebelow, and a plurality of parallel channel members having spaced apart base portions secured to said skin sheet transversely of the frame runner, adjacent channel members having their adjacent side portions disposed for a portion of their extent in converging relation and then substantially parallel to each other, means securing said parallel portions together, and means securing said channel members to said frame runner, said runner securing means including flanges on said members extending away from the connected portions between members, each of said channel members having a longitudinally extending corrugation intermediate its side portions.

3. A reinforced skin sheet and frame construction, comprising a metal skin sheet, stringer reinforcing means, and a frame element arranged transversely of the stringer means at a distance from the skin sheet, said stringer means including parallel side portions extending away from the skin sheet and secured together, divergent portions extending toward the skin sheet from the parallel side portions, and base portions turned outwardly from the divergent portions into parallelism with the skin sheet and secured thereto, and means connecting the stringer reinforcing means through portions spaced from the skin sheet to the frame element.

4. A reinforced skin sheet and frame construction, comprising a metal skin sheet, stringer reinforcing means, and a frame element arranged transversely of the stringer means at a distance from the skin sheet, said stringer means including parallel side portions extending away from the skin sheet and secured together, divergent portions extending toward the skin sheet from the parallel side portions, base portions turned outwardly from the divergent portions into parallelism with the skin sheet and secured thereto, and a hollow bulb portion adjoining the parallel side portions, and means connecting the stringer reinforcing means through portions spaced from the skin sheet to the frame element.

5. A reinforced skin sheet and frame construction, comprising a metal skin sheet, stringer reinforcing means, and a frame element arranged transversely of the stringer means at a distance from the skin sheet, said stringer means including parallel side portions extending away from the skin sheet and secured together, divergent portions extending toward the skin sheet from the parallel side portions, base portions turned outwardly from the divergent portions into parallelism with the skin sheet and secured thereto, and a corrugated portion between the base portions, the corrugated portion and the open space between the divergent portions providing bendability for curvilinear disposition of the skin sheet before attachment to the stringer means, and means connecting the stringer reinforcing means through portions spaced from the skin sheet to the frame element.

6. A reinforced skin sheet and frame construction, comprising a metal skin sheet, stringer reinforcing means, and a frame element arranged transversely of the stringer means at a distance from the skin sheet, said stringer means including parallel side portions extending away from the skin sheet and secured together, divergent portions extending toward the skin sheet from the parallel side portions, base portions turned outwardly from the divergent portions into parallelism with the skin sheet and secured thereto, a corrugated portion between the base portions, and a tubular portion along the parallel portions, the corrugated portion and the open space between the divergent portions providing bendability for curvilinear disposition of the skin sheet before attachment to the stringer means, and means connecting the stringer reinforcing means through portions spaced from the skin sheet to the frame element.

7. A reinforced skin sheet and frame construction, comprising a metal skin sheet, stringer reinforcing means, and a frame element arranged transversely of the stringer means at a distance from the skin sheet, said stringer means comprising spaced base portions secured to the skin sheet and intervening corrugated portions which are open toward the skin sheet, one of said corrugated portions having parallel side portions projecting therefrom and secured together to form a web, a tubular portion along the projecting web portion, and lateral elements extending outwardly from the web portion and secured to the frame element.

MICHAEL WATTER.